June 19, 1956 H. KLEIN ET AL 2,751,059
APPARATUS FOR GROUPING CONVEYED ARTICLES
Filed April 28, 1955 4 Sheets-Sheet 1

INVENTORS
HARRY KLEIN
THEODORE W. ZIMMER
BY
ATTORNEY

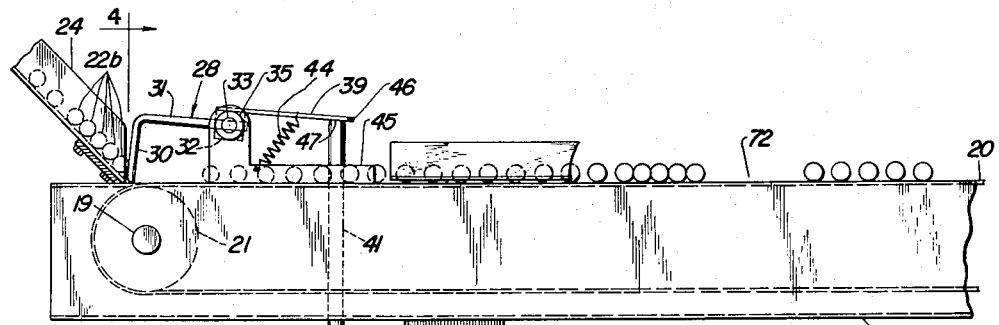
FIG. 3.
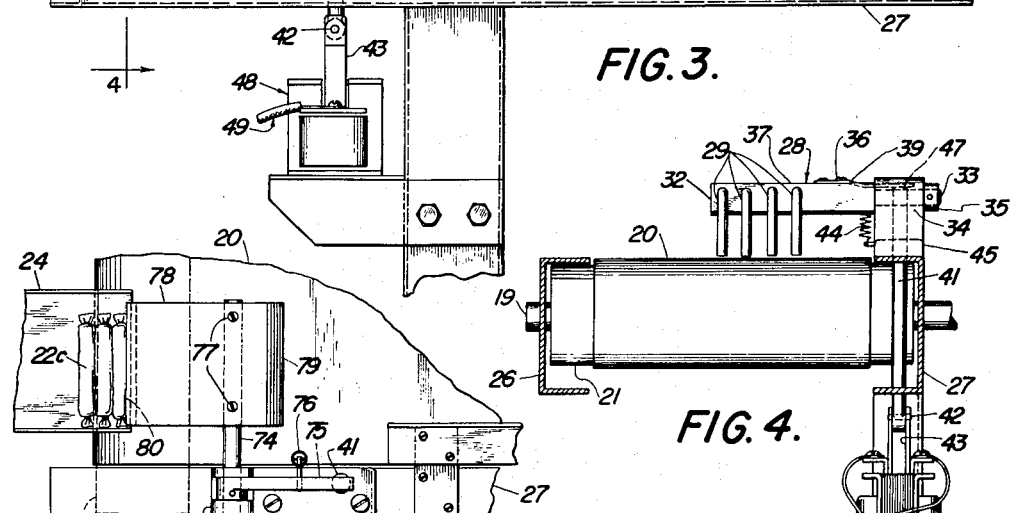
FIG. 4.
FIG. 6.
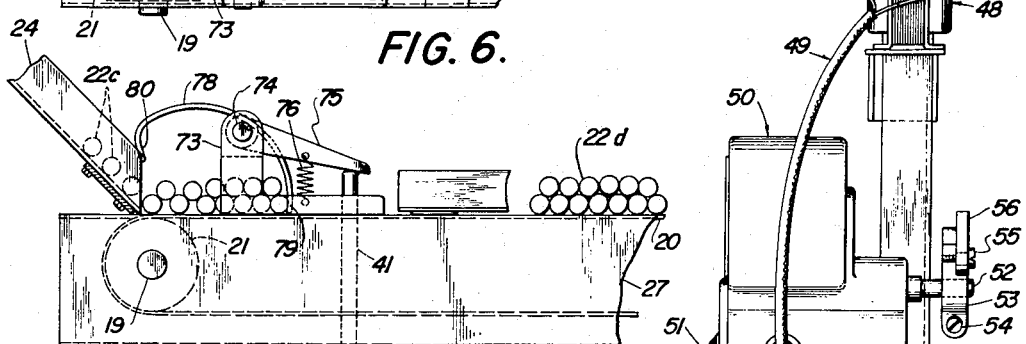
FIG. 5.
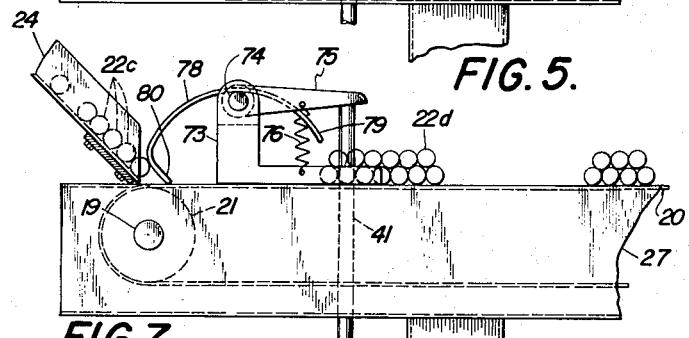
FIG. 7.
INVENTORS
HARRY KLEIN
THEODORE W. ZIMMER
BY
ATTORNEY

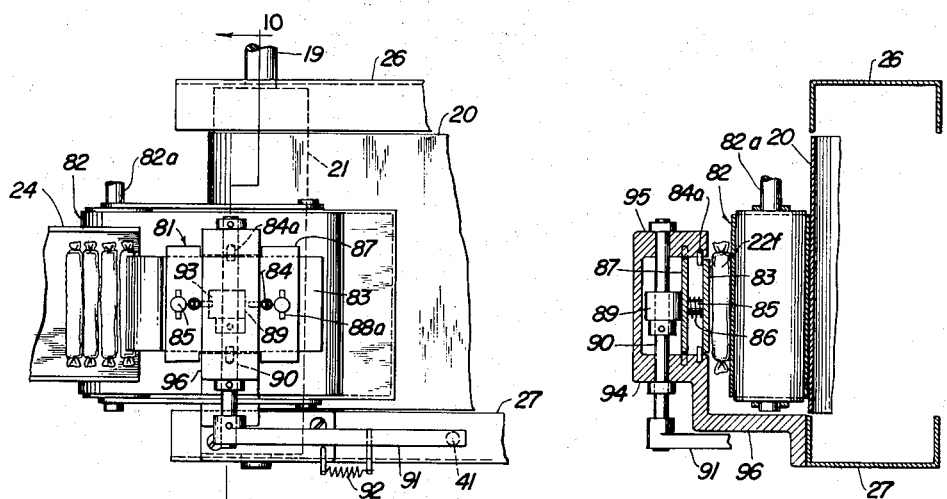
FIG. 9.
FIG. 10.
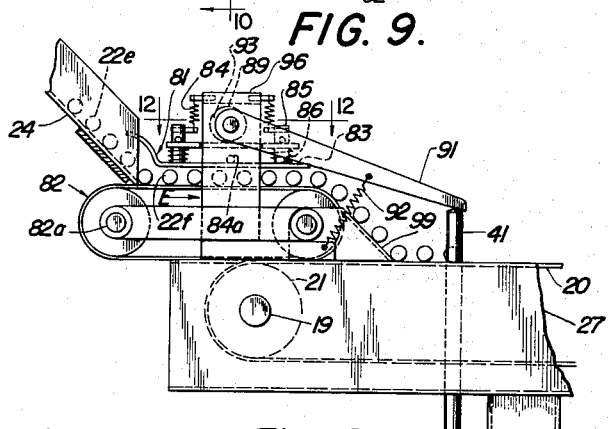
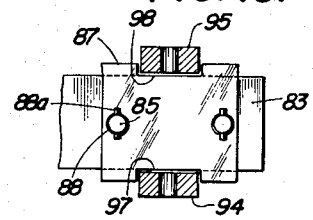
FIG. 12.
FIG. 8.
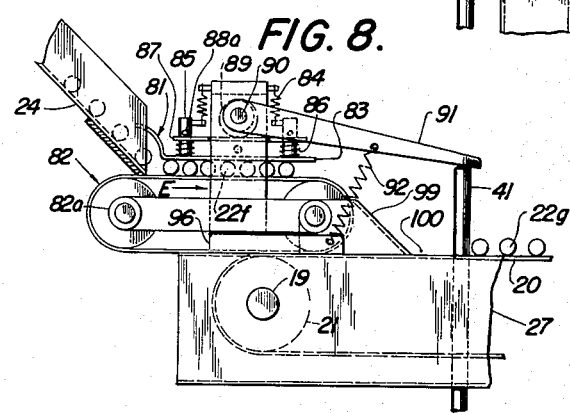
FIG. 11.

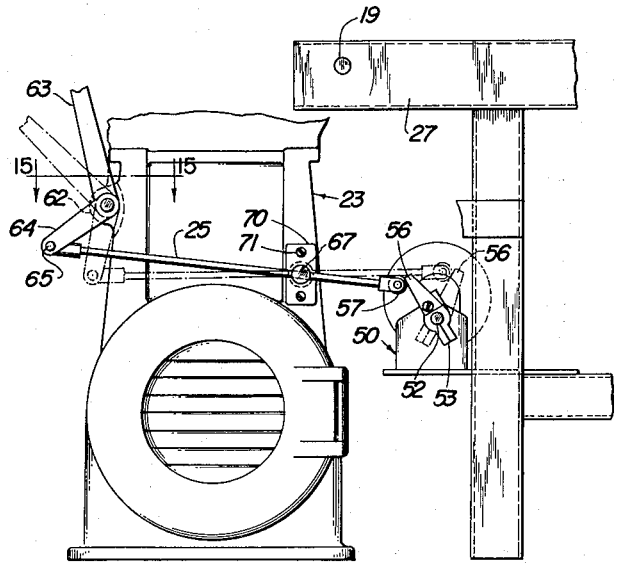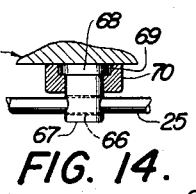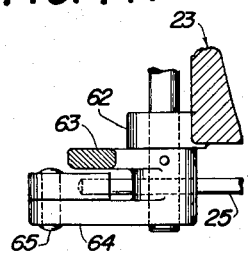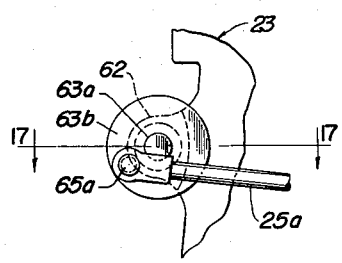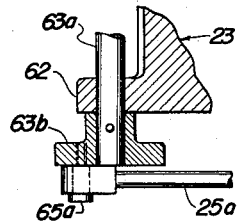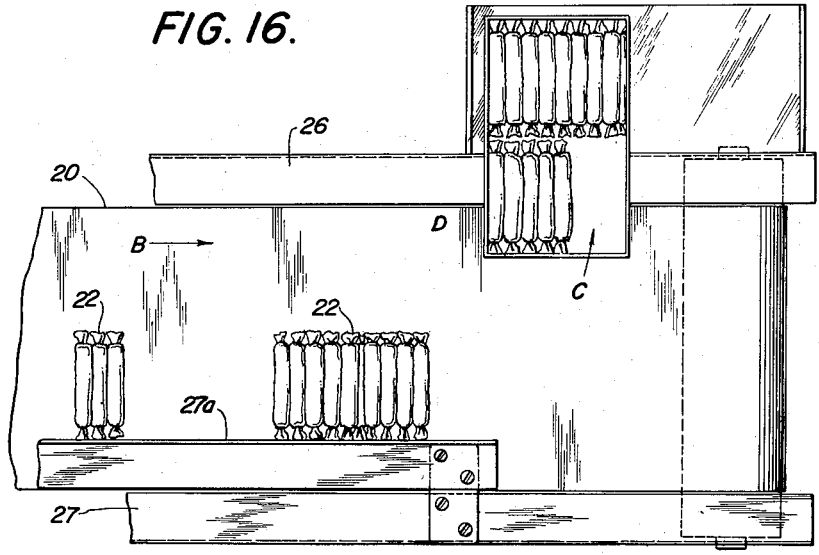

United States Patent Office 2,751,059
Patented June 19, 1956

2,751,059
APPARATUS FOR GROUPING CONVEYED ARTICLES

Harry Klein, Brooklyn, and Theodore W. Zimmer, Woodside, N. Y., assignors to K and Z Machinery Corporation, Brooklyn, N. Y., a corporation of New York Application April 28, 1955, Serial No. 504,632

3 Claims. (Cl. 198—34)

This invention relates to conveyor apparatus—more particularly to a method and device for receiving processed units from an automatic machine—such as wrapped candy bars from a wrapping machine—arranging such units into separated groups of a predetermined number of pieces, and conveying such groups to a point of discharge.

It is within the contemplation of this invention to provide an apparatus which will automatically accomplish the receiving, grouping and conveying steps above-mentioned for packaging purposes, either by delivery to a box filling station where an operator sweeps or otherwise directs the grouped units into a packing box, or to a bag-filling chute mechanism, or to a discharge gate where the groups are received by a take-away belt for delivery to some designated locale. In the conventional methods of accomplishing similar objectives, processed units in a row are delivered to a conveyor belt from which an operator, stationed at a discharge point, counts and sweeps a given number of the units into a carton or bag—a process which is time-consuming, costly, and subject to error in the determination of the proper count of units to be packaged. Where attempts have been made to employ automatic counters, such as by photoelectric mechanisms or other counting devices, there is the danger of missed counts due to an off-position of a unit being conveyed, or the costly and inconvenient need periodically to interrupt the operation of the processing machine—such as a wrapping mechanism—so as to produce the desired grouping. It is our objective to provide a mechanism having none of the aforesaid shortcomings, and which will be capable, after a presetting of a counting device, to count and deliver groups of predetermined numbers of units at a high rate of speed.

In connection with the last-mentioned aspect of this invention, it is our further object to provide a novel and compact gate device—including various embodiments thereof—adapted for connection to said counting and processing mechanisms, whereby there is no interruption of said processing mechanism during the grouping operation performed by our invention.

It is a further object of our invention to enable it to be operated coactively with continuous processing machines actuated by various drives, such as a reciprocating drive or a rotary drive, so that the apparatus of our invention will operate in synchronism with any processing machine to which it is operatively connected.

And in the accomplishment of the above objectives, it is our further object to reduce the number of packaging operators to one, and place him in a comfortable and convenient position in which unnecessary body and hand motions in gathering and counting the conveyed units are obviated, and to enable the device to be effectively and efficiently operated in a minimum of space.

Other objectives, features, and advantages will appear from the drawings and the description hereinafter given.

Referring to the drawings,

Fig. 3 is a fragmentary side view substantially like Fig. 1 but showing the gate in its closed operative position.

Fig. 4 is a fragmentary section of Fig. 3, taken on line 4—4, the conveyed units being omitted.

Fig. 5 is a fragmentary side view of the gate portion of a modified form of our invention, the gate being shown in open position.

Fig. 6 is a fragmentary plan view of Fig. 5.

Fig. 7 is a view substantially like Fig. 5, but showing the gate in its closed position.

Fig. 8 is a fragmentary side view of another modification of the gate portion of our invention, showing conveyed units free to move on to the main conveyor portion of our invention.

Fig. 9 is a plan view of Fig. 8.

Fig. 10 is a sectional view of Fig. 9 taken along line 10—10.

Fig. 11 is a view substantially like Fig. 8, but showing the gate member in its operative holding position.

Fig. 12 is a fragmentary section of Fig. 8 taken along line 12—12.

Fig. 13 is a fragmentary side view of the apparatus of Fig. 1 in somewhat reduced proportions, showing a portion of the automatic wrapping machine and its operative reciprocating connection to the counter switch employed in our invention, the dot-dash lines showing certain of the parts in their limiting positions opposite that shown in full lines.

Fig. 14 is a fragmentary plan view, shown partly in section, of a portion of Fig. 13.

Fig. 15 is a fragmentary section of Fig. 13 taken along line 15—15.

Fig. 16 is a fragmentary side view of a modified form of motion-take-off device employed in the processing machine, showing the continuous rotary drive thereof.

Fig. 17 is a fragmentary section of Fig. 16 taken along line 17—17.

Fig. 18 is a fragmentary plan view of the apparatus of Fig. 1, showing a portion thereof at the discharge region of the machine.

Figure 2:
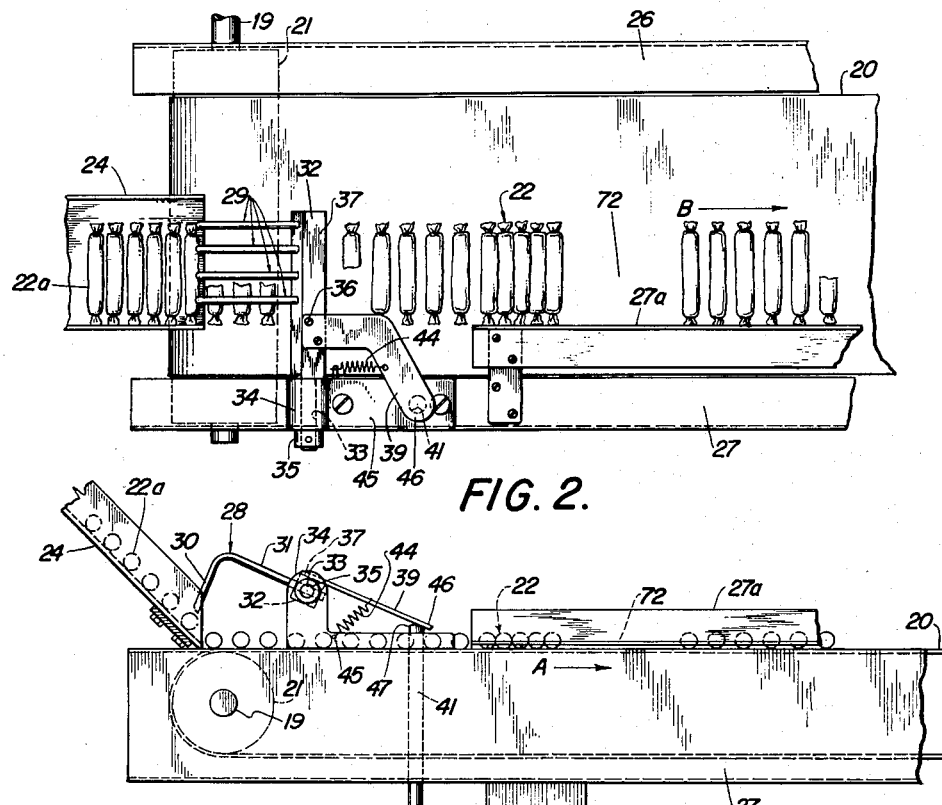
Fig. 2 is a fragmentary plan view of Fig. 1.
Figure 1:
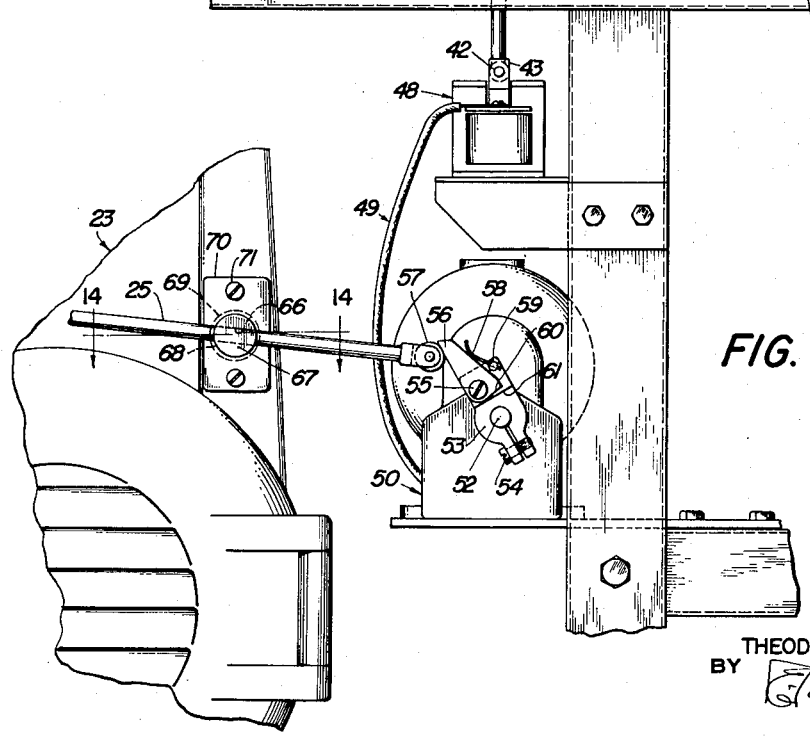
Fig. 1 is a fragmentary side elevation of a form of apparatus according to our invention, showing fragmentary portions of an automatic wrapping and single-line delivery machine feeding the conveyor portion of our invention, the gate mechanism thereof being shown in open retracted position.

In the form of our invention illustrated in Figs. 1 to 4, a conveyor belt 20, operatively mounted on a rotatable drum 21, the shaft 19 of which is connected to drive means not shown, and moving in the direction indicated by arrow A (Fig. 1), conveys thereon the processed units, generally designated 22, to a discharge point at an advanced portion of the path of travel of the belt. The said units may consist of any products that are delivered in a row to said conveyor belt 20—the drawings illustrating, for purposes of example only, wrapped candy bars which are semi-schematically illustrated in the drawings—said candy bars having previously been wrapped by the automatic machine generally designated 23 and delivered, through chute 24, to the conveyor belt 20, as illustrated. The particular construction of machine 23, together with its own conveying and delivery mechanism to chute 24, is well known to those skilled in the art and need not be described herein, since such description is not necessary for an understanding of the present invention. Devices similar to machine 23 both for wrapping candy or for delivery of other processed units, are in common use and are known to be able to deliver a continuous row of such units to a discharge point, and thence to a passageway such as said chute 24. Suffice it to say, for the present purpose, that said machine 23, for each processing operation, causes the reciprocating actuation of the actuator rod 25, the operation of said rod being accomplished by a mechanism to be hereinafter referred to.

Included in the framework of said conveyor are two laterally opposite channels 26 and 27, these being adapted to support the rollers or drums 21 for the conveyor belt, as well as a certain gate and holding mechanism to be now described. This mechanism, in the particular form illustrated in Figs. 1 to 4, and generally designated 28, comprises four L-shaped fingers 29, the rear downwardly extending portions 30 thereof being adapted, when the gate is closed, to intercept the units 22a in chute 24, as shown in Fig. 3—the other limiting position of said fingers, in which the units 22a are permitted to pass forwardly from chute 24, being the open position shown in Fig. 1. The forwardly extending portions 31 of said fingers 29 extend into and are secured to the square shaft 32, the end portion 33 of which is rotatably mounted within bearing 34, and secured against detachment by collar 35 (Fig. 2). Secured by fasteners 36 to the flat face 37 of shaft 32 is a substantially L-shaped arm 39, the outwardly extending portion of which is disposed over the upwardly extending push rod 41 pivotally mounted at 42 to the movable solenoid member 43. A spring 44, anchored to the base 45 of bearing member 34, and attached to arm 39, urges said arm downwardly so that the outer terminal portion 46 of said arm 39 is in yieldable pressing engagement with the upper terminal 47 of said push rod 41. The arrangement is hence such that when the movable solenoid member 43 is operatively actuated upwardly, in a manner to be hereinafter described, it urges the rod 41 and arm 39 upwardly against the action of spring 44, whereupon the consequent rotary motion of shaft 37 causes the gate 28 to move downwardly to its operatively closed position shown in Figs. 3 and 4.

The said solenoid 48 is operatively connected, by conductors 49, to a counter-switch device, generally designated herein 50, which is of the type provided with means for energizing the solenoid 48 upon receiving a predetermined number of impulses, such as through the reciprocating action of rod 25, to bring the movable member 43 of the solenoid into its upper projected position, and to hold it in such position for another predetermined series of impulses. The arrangement is such that this cycle of actuation and holding, in response to mechanical impulses, is continuously repeated during the operation of the said machine 23. The said counter device 50 contains thereon a dial 51 (Fig. 4), which enables the device to be set for operatively actuating the solenoid in accordance with selected numbers of impulses. The said device 50 is well known to those skilled in the art, and a description thereof is not necessary for an understanding of the invention. Hence, no details thereof are shown. One type of counter-switch, among others, that may be employed as said component 50 is that described in U. S. Patent 2,489,474.

For the purpose of this specification it need merely be stated that the counting, circuit-closing and circuit-opening mechanism of device 50 is operatively connected to shaft 52 upon which is mounted the bracket 53 secured in place by the fastener 54. Said bracket contains thereon a stud 55 over which is rotatably mounted the pawl 56 in engagement with the roller 57 mounted at the end of said actuator rod 25. A spring 58, anchored at 59 on bracket 53, urges the pawl 56 into yieldable engagement with the said roller 57. The base 60 of said pawl forms a small acute angle with the adjacent wall 61 of the bracket 53, so as to permit a slight movement of the pawl 56 relative to said bracket—said base 60 being engageable with wall 61 upon an operative actuation of the pawl by the rod 25. This slight relative movement between pawl 56 and bracket 53, against the action of spring 58, constitutes in effect a shock absorber to soften the impact of the rod 25 in operatively actuating the internal mechanism of counter device 50.

By referring to Fig. 13, it will be seen that machine 23 contains thereon a stationary bracket 62—said bracket pivotally supporting thereon the reciprocating arm 63 which moves between the full line to the dot-dash line positions upon each operative actuation of the mechanism of machine 23—such as upon each wrapping operation thereof. The terminal portion of arm 63 is, in the embodiment illustrated, of bell-crank configuration, the terminal branch 64 thereof being pivotally connected at 65 to said actuating rod 25. The latter slidably extends through the internal aperture 66 of the lug 67, the base 68 of which is rotatably mounted within the recess 69 of the fitting 70 attached by fasteners 71 to machine 23. The arrangement is hence such that for each operative reciprocation of arm 63, the actuating rod 25 will be correspondingly reciprocatingly actuated, the rotation of lug 67 permitting such movement. Each reciprocal actuation of rod 25 causes an operative partial rotation of shaft 52, through the pawl 56 and the associated parts hereinabove described. For each such operative movement of shaft 52, the counting mechanism within counter-switch 50 receives an actuating impulse. After a given number of such impulses, in accordance with the setting of dial 51 in known manner, the circuit through conductor 49 is closed, the solenoid energized, and the member 43 thereof correspondingly actuated, to cause a closing of gate 28, as hereinabove described. The gate is held closed for a further series of impulses imparted to device 50 by rod 25; and after the completion of such second series of impulses, the circuit through conductor 49 is opened by operation of counter device 50, the solenoid 48 de-energized, and the gate 28 returned to its open position by the action of spring 44.

If machine 23 operates by a continuous rotary drive, having a continuously rotating shaft 63a, an eccentric plate 63b is mounted thereupon as shown in Figs. 16 and 17, and the rod 25a pivotally connected thereto at 65a, in known manner, to obtain the required reciprocating action of said rod 25a.

If it is assumed, for illustrative purposes, that our apparatus is to deliver separated groups of twenty units, the device 50 is operatively set, in timed relation with the speed of conveyor belt 20, so as to operate the solenoid 48 upwardly once for each series of twenty impulses, thereby permitting the movement of twenty units past a given point for each cycle. However, in order to create a gap 72 between adjacent groups of units, it is necessary to hold back the units 22a in the chute from being deposited on the conveyor belt 20 during a selected interval. For illustrative purposes, we may assume that the selected interval is that of five oscillations of rod 25. The device 50 is set accordingly, to hold the solenoid 48 during an interval of five impulses, so that the gate 28 will be maintained in its closed position for an interval of five oscillations of rod 25. During such gate-closing period, there will be an accumulation of five adjacent units 22b (Fig. 3). Upon the completion of the cycle, when gate 28 is raised, the group 22b will be separated from the previous group, in the manner indicated. Hence, the units being conveyed on belt 20 will each consist of twenty pieces, five being close together, but each group being well separated from the next adjacent group by space 72.

In the embodiment illustrated, a guide bar 27a, supported from channel 27, is employed, to guide the row of conveyed units along the predetermined path in the direction of arrow B, towards the discharge region D of the apparatus. The arrangement is hence such that a packaging operator stationed at said discharge region can readily gather together all the units constituting a group, within an area that, as determined in advance, can be within his convenient reach. In this manner, the operator can readily, and without lost motion, scoop or otherwise direct each group of units into a carton C or other receptacle. Likewise, where a take-away conveyor or bagging devices are operatively arranged in adjacent relation to conveyor belt 20, in well known manner, said take-away conveyor or bagging devices can be made readily to receive said groups of units.

It is important to observe that during the entire grouping and conveying operation above described there has been no interruption whatsoever to the processing or wrapping operation of machine 23. In other words, machine 23 is permitted to continue its operations without any interruption, since the arrangement is such as to permit the counter device 50 to continue its counting operations while the gate 28 is in both its operative open and closed positions.

A modified form of gate mechanism is illustrated in Figs. 5, 6, and 7, for the purpose of permitting a more compact bunching of each group of units. The bearing bracket 73 supports the rotatable shaft 74 which carries the arm 75, this latter being in engagement with the upper portion of push rod 41, the spring 76 urging said arm 75 against the rod 41, in the manner aforesaid. Fixed by fasteners 77 to shaft 74 is the gate member 78 shaped generally in the form of a scoop. In the specific embodiment thereof shown, the forward portion of said gate contains a downwardly extending curved wall or front barrier 79, the rear portion of said gate having the downwardly extending wall or rear barrier 80. The parts are so proportioned and arranged that when the rod 41 is in its inoperative position shown in Fig. 5, the units 22c in the chute 24 are free to move on to the conveyor 20. It is noted, however, that said front barrier 79 constitutes a wall to prevent the units from moving therepast, so that said units accumulate in a compact group rearwardly of said wall 79. However, when the rod 41 is operatively actuated upwardly in the manner above described, the gate 78 is rotatably actuated to the position shown in Fig. 7. In said latter position, the rear barrier wall 80 is disposed in intercepting relation to the discharge end of chute 24, preventing the units 22c from moving therepast. When the gate is in this position the barrier 79 is in its raised position, thereby permitting the group of units 22d to move forwardly. It is thus apparent that in this arrangement each group, while containing a predetermined number of pieces, is compactly arranged, enabling a more ready removal thereof from the conveyor belt than in the embodiment first above described.

In the modification of our invention illustrated in Figs. 8–12, another form of gate and holding device 81 is employed in conjunction with the auxiliary conveyor 82, the shaft 82a of which is connected to drive means not shown, said auxiliary conveyor moving in the direction of arrow E. Said device 81 comprises a bottom plate 83 disposed over the conveyed units 22 and urged upwardly, by spring means 84, to its open inoperative limiting position in engagement with stops 84a—at which position plate 83 clears the tops of the units 22 to permit them to move forwardly with the said auxiliary conveyor 82. Affixed to and extending upwardly from plate 83 are the two posts 85 enveloped by the springs 86. An upper plate 87, with holes 88 therein in registry with said posts 85, is slidably mounted over the said posts and above said springs 86, the pins 88a providing an upper limit for the movement of said plate 87. In engagement with said upper plate is the cam 89 affixed to the rotatably mounted shaft 90 carrying arm 91 yieldably held in engagement with the top of rod 41 by spring 92. The upwardly extending guides 94 and 95, constituting part of bracket 96, are disposed partly within the lateral recessed portions 97 and 98 of said plate 87, whereby the latter and its associated parts are held against substantial longitudinal and lateral displacement.

When said rod 41 is operatively urged upwardly, in the manner aforesaid, the arm 91 will be actuated upwardly to cause a rotation of shaft 90. This will cause said cam 89 to rotate, whereby the high portion 93 thereof will engage upper plate 87 to urge it downwardly. The downward movement of plate 87 will be transmitted through springs 86 to the bottom plate 83, against the action of spring means 84, to bring said bottom plate into frictional engagement with the underlying units 22f. The size of plate 83 is proportioned to engage a predetermined number of units. The pressure of bottom plate 83 against the said units 22f will cause a frictional retardation of the forward movement of said engaged units on said auxiliary belt 82, while the forwardly disposed units continue along their operative path without retardation. Hence, when said retarded units 22f pass forwardly, and down along the inclined wall 99 to the main conveyor belt 20, there will be a gap 100 between group of units 22f and the advanced group 22g.

It is thus apparent that in this last-described embodiment of our invention, as well as the others above described, separated groups of a predetermined number of units are provided for packaging or other subsequent operations, to accomplish these various objectives of our invention.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

We claim:

1. In an apparatus for receiving, grouping and conveying a plurality of units, in combination with a machine of the type having a delivery outlet and adapted to deliver a continuous row of said units to said outlet and further having a movable member operatively actuated upon the delivery operations of said machine, and with a counter-switch device operatively connected to said movable member and of the type adapted to be operatively actuated into circuit-opening and circuit-closing positions by a predetermined number of impulses, and having a shaft movable into two limiting positions upon the operative actuation of said device into its said circuit-opening and circuit-closing positions, each operative movement of said movable member comprising one of said impulses, the combination of a conveyor positioned to receive the units from said outlet, a holding device operatively movable between an operative limiting position in intercepting relation to the path of said row of units from said outlet to said conveyor, and an inoperative limiting position in non-obstructing relation to said path, electro-mechanical means operatively connected between said holding device and said counter-switch device, whereby upon the operative actuation of said counter-switch device to said respective circuit-opening and circuit-closing positions said holding device is operatively moved between said two limiting positions, respectively; a pawl operatively mounted on said shaft and movable therewith, and reciprocating means operatively connected to said movable member and in operative engagement with said pawl, whereby the operative movements of said movable member will operatively actuate said shaft between its said two limiting positions.

2. In an apparatus for receiving, grouping and conveying a plurality of units, in combination with a machine of the type having a delivery outlet and adapted to deliver a continuous row of said units to said outlet and further having a movable member operatively actuated upon the delivery operations of said machine, a conveyor positioned to receive the units from said outlet, a holding device operatively movable between an operative limiting position in intercepting relation to the path of said row of units from said outlet to said conveyor, and an inoperative limiting position in non-obstructing relation to said path; actuating means for moving said holding device between said two limiting positions and operatively connected to said movable member, and means connected to said actuating means for maintaining said holding device in its respective operative and inoperative positions for predetermined operative movements of said movable member; said holding device comprising an auxiliary conveyor interposed between and in the path of said delivery outlet and said first-mentioned conveyor, whereby units from said delivery outlet are received by said auxiliary conveyor for delivery to said first-mentioned conveyor, a movable horizontal plate over said auxiliary conveyor and movable between a lowered position in which it is in frictional engagement with units operatively on said auxiliary conveyor, and an upper position out of engagement therewith, the said actuating means including means to raise and lower said plate between its said two positions.

3. In an apparatus for receiving, grouping and conveying a plurality of units, in combination with a machine of the type having a delivery outlet and adapted to deliver a continuous row of said units to said outlet and further having a movable member operatively actuated upon the delivery operations of said machine, a conveyor positioned to receive the units from said outlet, a holding device operatively movable between an operative limiting position in intercepting relation to the path of said row of units from said outlet to said conveyor, and an inoperative limiting position in non-obstructing relation to said path; actuating means for moving said holding device between said two limiting positions and operatively connected to said movable member, and means connected to said actuating means for maintaining said holding device in its respective operative and inoperative positions for predetermined operative movements of said movable member; said holding device comprising an auxiliary conveyor interposed between and in the path of said delivery outlet and said first-mentioned conveyor, whereby units from said delivery outlet are received by said auxiliary conveyor for delivery to said first-mentioned conveyor, a movable horizontal plate over said auxiliary conveyor and movable between a lowered position in which it is in frictional engagement with units operatively on said auxiliary conveyor, and an upper position out of engagement therewith, said actuating means including cam means to depress said plate towards its said lowered position, and spring means urging said plate upwardly from said lowered position.

References Cited in the file of this patent

UNITED STATES PATENTS

| | | |
|---|---|---|
| 620,820 | Zies | Mar. 7, 1899 |
| 1,042,200 | Caughrean | Oct. 22, 1912 |
| 1,359,484 | Bourne | Nov. 23, 1920 |
| 2,052,840 | Nussbaum | Sept. 1, 1936 |